US010551272B2

(12) United States Patent
Shiwa et al.

(10) Patent No.: US 10,551,272 B2
(45) Date of Patent: Feb. 4, 2020

(54) LEAKAGE DETECTION DEVICE

(71) Applicant: SUBARU CORPORATION, Tokyo (JP)

(72) Inventors: Daiki Shiwa, Tokyo (JP); Daisuke Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/864,719

(22) Filed: Jan. 8, 2018

(65) Prior Publication Data
US 2018/0283976 A1    Oct. 4, 2018

(30) Foreign Application Priority Data

Mar. 30, 2017  (JP) ................................ 2017-068860

(51) Int. Cl.
| G01M 3/02 | (2006.01) |
| G01M 3/00 | (2006.01) |
| G01M 15/04 | (2006.01) |

(52) U.S. Cl.
CPC .......... *G01M 3/007* (2013.01); *G01M 15/042* (2013.01)

(58) Field of Classification Search
CPC ........................... G01M 15/042; G01M 15/09
USPC ...................................................... 73/114.01
See application file for complete search history.

(56) References Cited

U.S. PATENT DOCUMENTS

| 3,949,719 A | 4/1976 | Bellanca et al. |
| 5,499,616 A | 3/1996 | Enright |
| 5,792,949 A * | 8/1998 | Hewelt ................. G01M 3/025 |
| | | 123/41.86 |
| 2005/0022795 A1* | 2/2005 | Beyer .................... F01M 11/10 |
| | | 123/516 |

(Continued)

FOREIGN PATENT DOCUMENTS

| DE | 103 20 054 A1 | 11/2004 |
| DE | 10 2013 206 819 A1 | 10/2013 |

(Continued)

OTHER PUBLICATIONS

English Translation of JP 2014-058937, Apr. 2014.*

(Continued)

*Primary Examiner* — Peter J Macchiarolo
*Assistant Examiner* — Alexander A Mercado
(74) *Attorney, Agent, or Firm* — McGinn I. P. Law Group, PLLC.

(57) ABSTRACT

A leakage detection device for detecting leakage in a positive crankcase ventilation (PCV) passage having at least a scavenging line and a fresh air line includes: a first pressure measurement unit that measures a pressure in the PCV passage; a leakage detection valve that opens and closes the fresh air line; a PCV valve that adjusts a flow rate of blow-by gas; a second pressure measurement unit that measures a pressure in the intake passage; a first valve controller that controls the leakage detection valve when a leakage diagnostic condition is satisfied; a second valve control unit that reduces an opening degree of the PCV valve, and suppresses a flow rate in the PCV passage based on the pressure in the intake manifold after the leakage detection valve is closed; and a leakage determination unit that determines whether leakage occurs based on the pressure in the PCV passage.

20 Claims, 5 Drawing Sheets

(56) References Cited

U.S. PATENT DOCUMENTS

| | | | | |
|---|---|---|---|---|
| 2010/0147270 | A1* | 6/2010 | Pursifull | F01M 1/16 123/521 |
| 2011/0197864 | A1* | 8/2011 | Karcher | F02M 25/06 123/574 |
| 2013/0282255 | A1* | 10/2013 | Pursifull | G01F 23/0076 701/102 |
| 2014/0081549 | A1* | 3/2014 | Rollinger | F01M 13/00 701/101 |
| 2014/0081564 | A1* | 3/2014 | Pursifull | F02M 35/10222 701/113 |
| 2015/0167591 | A1 | 6/2015 | Sato et al. | |
| 2015/0285111 | A1 | 10/2015 | Rollinger et al. | |
| 2016/0097355 | A1* | 4/2016 | Jentz | F01M 11/10 701/102 |
| 2016/0265404 | A1* | 9/2016 | Fujii | F01M 13/0416 |
| 2016/0326990 | A1 | 11/2016 | Pursifull | |
| 2017/0002761 | A1* | 1/2017 | Dudar | F02D 41/22 |
| 2017/0268448 | A1 | 9/2017 | Takahashi et al. | |
| 2017/0335739 | A1* | 11/2017 | Noguchi | F01N 5/02 |
| 2018/0030937 | A1 | 2/2018 | Golladay et al. | |

FOREIGN PATENT DOCUMENTS

| | | |
|---|---|---|
| DE | 10 2013 218 264 A1 | 3/2014 |
| DE | 10 2013 218 296 A1 | 5/2014 |
| DE | 10 2013 224 030 B4 | 6/2015 |
| DE | 10 2015 116 483 A1 | 4/2016 |
| DE | 10 2009 008 831 B4 | 9/2016 |
| DE | 10 2015 213 982 A1 | 1/2017 |
| EP | 2 698 510 A1 | 2/2014 |
| JP | H 10-184336 A | 7/1998 |
| JP | 2013-117176 A | 6/2013 |
| JP | 2014058937 A * | 4/2014 |
| JP | 2017-166449 A | 9/2017 |
| WO | WO 2012/140734 A1 | 7/2014 |

OTHER PUBLICATIONS

JPO Decision of Grant in JPA No. 2017-068860 dated Aug. 28, 2018.

United States Office Action dated Feb. 4, 2019 in co-pending U.S. Appl. No. 15/390,184.

United States Office Action dated May 31, 2019 in U.S. Appl. No. 15/390,184.

German Office Action, dated Aug. 12, 2019, in German Application No. 10 2018 201 804.9 and English Translation Thereof.

* cited by examiner

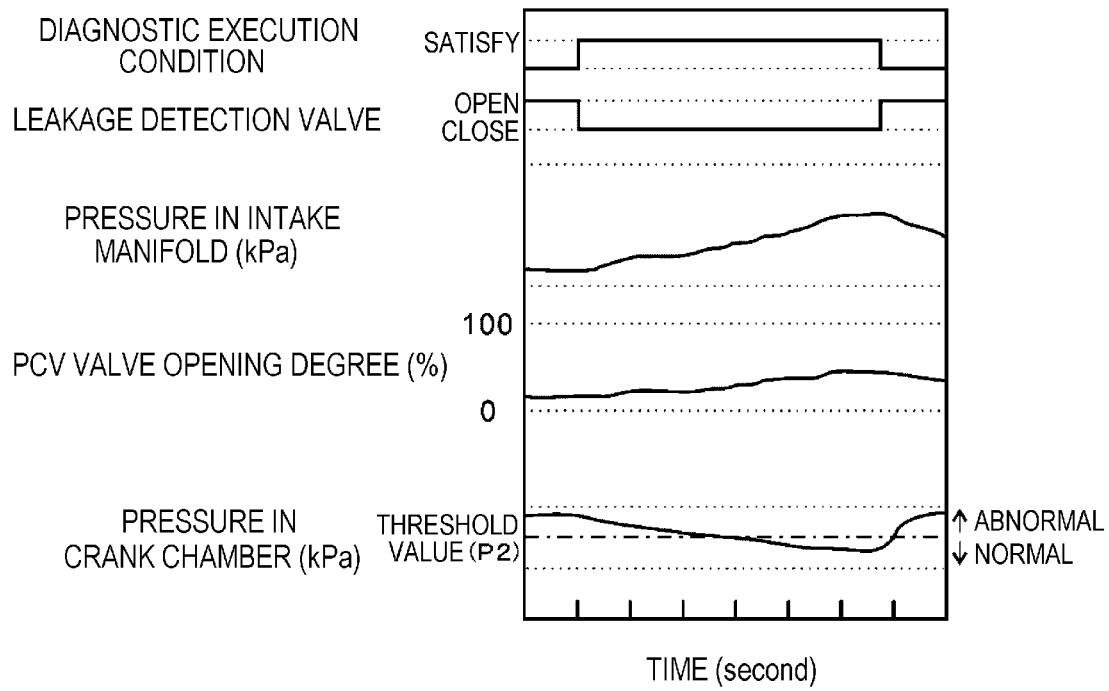
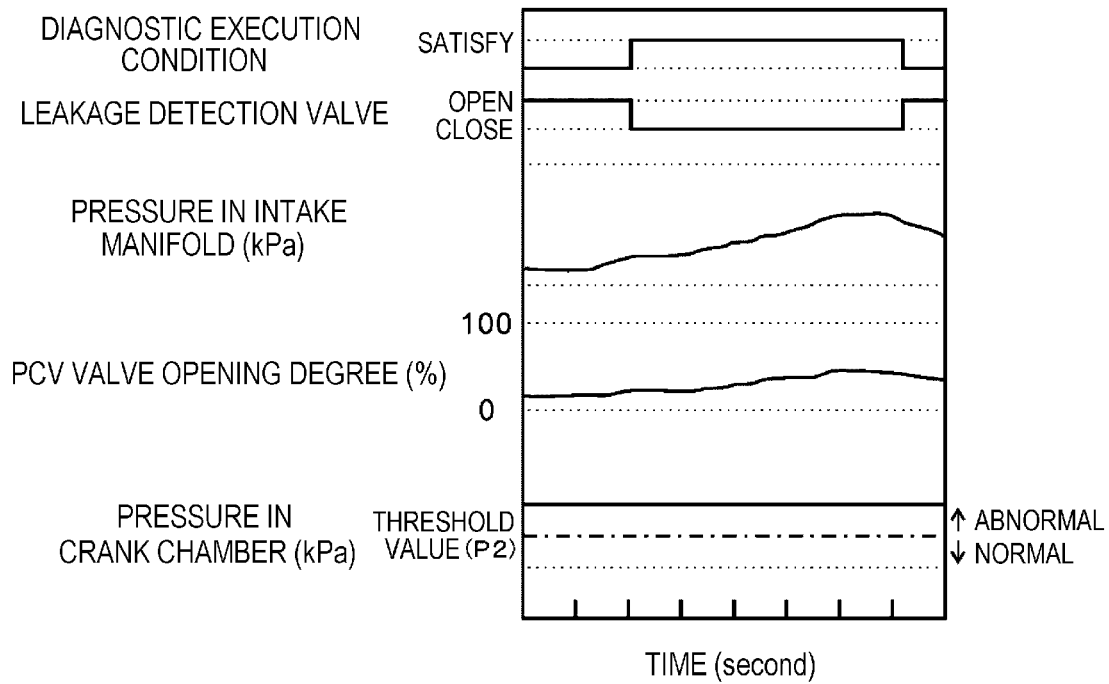

LEAKAGE DETECTION DEVICE

CROSS-REFERENCE TO RELATED APPLICATIONS

The present application claims priority from Japanese Patent Application No. 2017-068860 filed on Mar. 30, 2017, the entire contents of which are hereby incorporated by reference.

BACKGROUND

1. Technical Field

The present invention relates to a leakage detection device for detecting leakage occurring in a flow passage constituting a PCV system of an engine.

2. Related Art

Conventionally, engines are provided with a PCV (Positive Crankcase Ventilation) system for guiding blow-by gas, which is leaked from a combustion chamber into a crankcase through a gap between a cylinder and a piston, to an intake passage.

In this PCV system, release of the blow-by gas to the atmosphere is prevented by returning blow-by gas, containing nitrogen oxides (NOx), carbon monoxide (CO), hydrocarbons (HC), for instance, to the intake passage of the engine via a blow-by gas passage.

Here, since blow-by gas is released to the atmosphere, if leakage occurs in the blow-by gas passage, it is necessary to detect any leakage in the blow-by gas passage. In view of this, a leakage detection device is proposed. For instance, an example of the leakage detection device is described in Japanese Unexamined Patent Application Publication (JP-A) No. 10-184336 where pressure is measured in the crankcase with which a blow-by gas passage is communicated, and detects leakage of the blow-by gas passage based on the pressure.

However, when the opening degree of a valve connected to the blow-by gas passage is abruptly changed when leakage in the blow-by gas passage is detected with the leakage detection device, combustion in the engine maybe affected and become unstable. When the combustion becomes unstable, drivability is affected.

SUMMARY OF THE INVENTION

It is desirable to provide a leakage detection device that has little influence on drivability and detects leakage in the blow-by gas passage of the engine.

As aspect of the present invention provides a leakage detection device configured to detect leakage in a positive crankcase ventilation passage that has at least a scavenging line that communicates with a crank chamber of an engine and an intake passage of the engine at a portion downstream of a throttle valve, and a fresh air line that communicates with the crank chamber and the intake passage at a portion of upstream of the throttle valve. The leakage detection device includes: a first pressure measurement unit configured to measure a pressure in the positive crankcase ventilation passage; a leakage detection valve configured to open and close the fresh air line; a positive crankcase ventilation valve configured to adjust a flow rate of blow-by gas conveyed to the scavenging line from the crank chamber; a second pressure measurement unit configured to measure a pressure in the intake passage of the engine downstream of the throttle valve; a first valve controller configured to perform control to close the leakage detection valve when a predetermined leakage diagnostic condition is satisfied; a second valve control unit configured to gradually reduce an opening degree of the positive crankcase ventilation valve before the leakage detection valve is closed, and suppress a flow rate in the positive crankcase ventilation passage to a predetermined amount in accordance with the pressure in the intake manifold after the leakage detection valve is closed, and a leakage determination unit configured to determine whether leakage occurs in the positive crankcase ventilation passage on a basis of the pressure in the positive crankcase ventilation passage.

BRIEF DESCRIPTION OF THE DRAWINGS

FIG. 3A is a diagram illustrating pressure data in a crank chamber in a normal state. FIG. 3B is a diagram illustrating pressure data in the crank chamber in an abnormal state (when leakage occurs).

DETAILED DESCRIPTION

Figure 1:
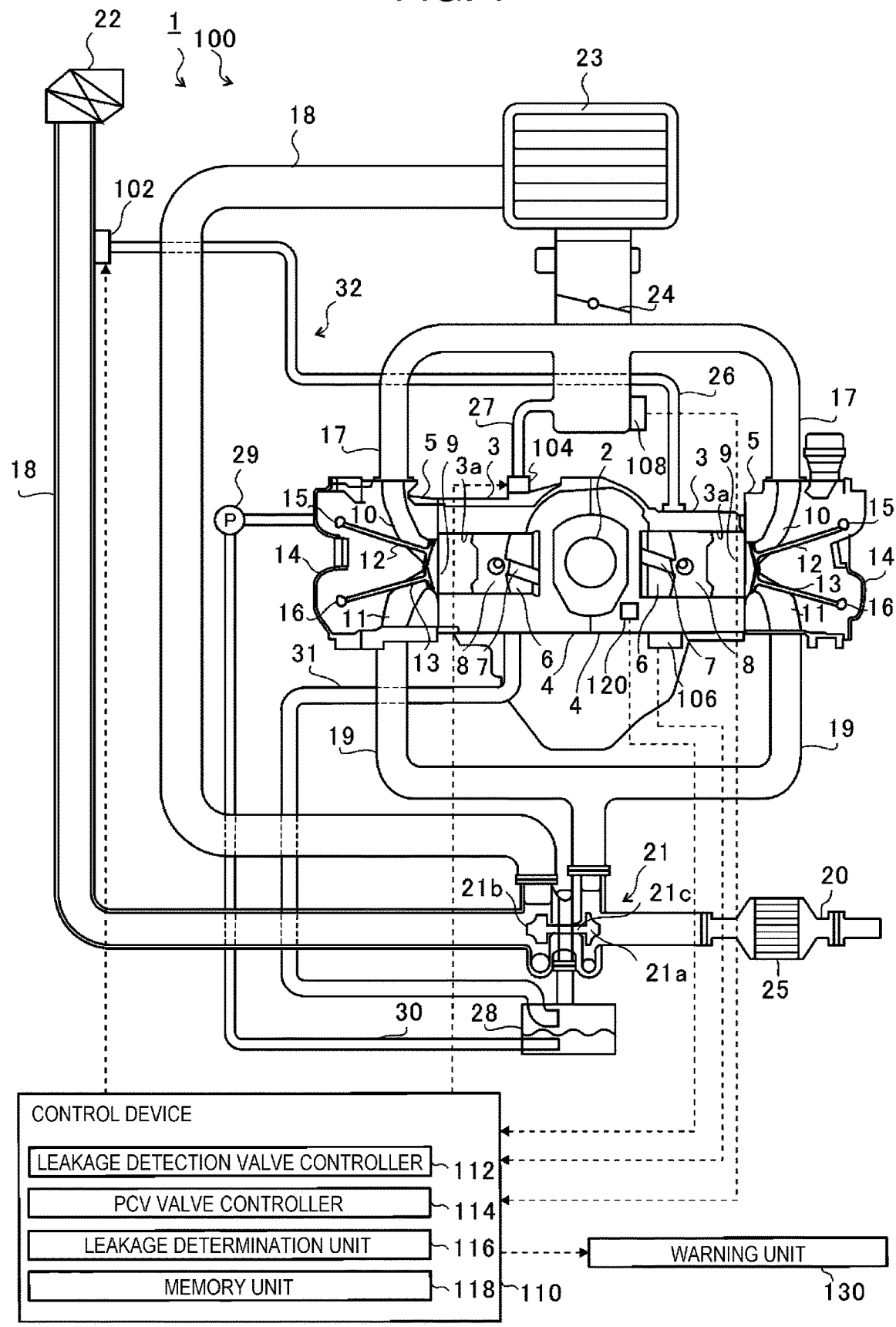
FIG. 1 is a schematic diagram of an engine provided with a leakage detection device according to an example of the present invention.

A preferred example of the present invention will now be described in detail with reference to the accompanying drawings. The dimensions, materials, specific numerical values, and the like illustrated in such an example are merely for facilitating understanding of the invention, and do not limit the present invention unless otherwise noted. In the present specification and drawings, elements having substantially the same function and configuration are denoted by the same reference numerals and redundant explanations are omitted, and elements not directly related to the present invention are omitted.

FIG. 1 is a schematic diagram of an engine 1 provided with a leakage detection device 100 according to an example of the present invention. First, a schematic configuration of the engine 1 will be described, and then a configuration of the leakage detection device 100 will be described.

As illustrated in FIG. 1, the engine 1 is a horizontally-opposed four-cylinder engine in which cylinder bores 3a formed in each of two cylinder blocks 3 are opposed to each other with a crankshaft 2 interposed in between.

A crankcase 4 is formed in one piece with the cylinder block 3, and a cylinder head 5 is fixed to the side opposite the crankcase 4. The crankshaft 2 is rotatably supported in a crank chamber 6 formed in the crankcase 4.

A piston 8 connected to the crankshaft 2 is slidably accommodated in the cylinder bore 3a via a connecting rod 7. In the engine 1, a space surrounded by the cylinder bore 3a, the cylinder head 5 and the crown surface of the piston 8 constitute a combustion chamber 9.

The cylinder head 5 is provided such that an intake port 10 and an exhaust port 11 are communicated with the combustion chamber 9. The end of an intake valve 12 is positioned between the intake port 10 and the combustion chamber 9, and the end of an exhaust valve 13 is positioned between the exhaust port 11 and the combustion chamber 9.

In the engine 1, an intake valve cam 15 and an exhaust valve cam 16 are provided in a cam chamber surrounded by the cylinder head 5 and a head cover 14. The intake valve cam 15 is in contact with the other end of the intake valve 12 and moves the intake valve 12 in the axial direction by rotating. As a result, the intake valve 12 opens and closes the opening between the intake port 10 and the combustion chamber 9. The exhaust valve cam 16 is in contact with the other end of the exhaust valve 13, and moves the exhaust valve 13 in the axial direction by rotating. As a result, the exhaust valve 13 opens and closes the opening between the exhaust port 11 and the combustion chamber 9.

An intake passage 18, which includes an intake manifold 17, are communicated with the intake port 10 at the upstream thereof. An exhaust passage 20, which includes an exhaust manifold 19, is communicated with the exhaust port 11 at the downstream thereof. The exhaust gas discharged from the combustion chamber 9 of each cylinder is collected by the exhaust manifold 19 via the exhaust port 11 and guided to a turbine 21a of a supercharger 21.

The supercharger 21 is configured to have the turbine 21a, which is rotated by the exhaust gas discharged from the exhaust manifold 19, and a compressor 21b, which rotates by the rotational power of the turbine 21a. The turbine 21a and the compressor 21b are connected by a turbine shaft 21c and rotate together.

The intake passage 18 is provided with an air cleaner 22, the compressor 21b, an intercooler 23, and a throttle valve 24 in that order from the upstream side. The compressor 21b compresses intake air, from which foreign matters such as dust and dirt are removed by the air cleaner 22, and supplies the compressed intake air to the downstream side.

The intake air that has been compressed by the compressor 21b and heated is cooled by the intercooler 23. By adjusting the opening degree of the throttle valve with an actuator (not illustrated), the throttle valve 24 varies the flow rate of intake air supplied to the combustion chamber 9.

Then, the intake air guided to the combustion chamber 9 and the air-fuel mixture injected from the injector (not illustrated) are burned by igniting the spark plug (not illustrated) provided to the cylinder head 5 at a predetermined timing. By such combustion, the piston 8 reciprocates in the cylinder bore 3a, and the reciprocating motion thereof is converted into rotational motion of the crankshaft 2 through the connecting rod 7. The exhaust gas generated by the combustion is guided to the turbine 21a via the exhaust port 11 and the exhaust manifold 19. After rotating the turbine 21a, the exhaust gas is purified by a catalyst 25 provided in the exhaust passage 20 and discharged to the outside of the vehicle.

Further, the engine 1 is provided with a fresh air line 26 that communicates with the crank chamber 6 and the intake passage 18 at a portion between the air cleaner 22 and the compressor 21b thereof. A leakage detection valve 102 is provided at the end of the fresh air line 26 that connects with the intake passage 18.

The leakage detection valve 102 is provided at the end of the fresh air line 26 that connects with the intake passage 18 and opens and closes the flow passage of the fresh air line 26. As will be described later in detail, the leakage detection valve 102 is opened while the leakage detection is not being performed (i.e., Non diagnosis state).

The engine 1 is also provided with a scavenging line 27 that communicates with the crank chamber 6 of the crankcase 4 and the intake manifold 17 at downstream of the throttle valve 24 of the intake passage 18. A PCV valve 104 constituting the leakage detection device 100 is provided at the connection between the scavenging line 27 and the crank chamber 6.

The PCV valve 104 is constituted by an electronic control valve with a plurality of intermediate available opening degrees, and by adjusting the opening degree, the flow rate of blow-by gas from the crank chamber 6 to the scavenging line 27 is adjusted.

The fresh air line 26 and the scavenging line 27 are provided mainly for scavenging blow-by gas in the crank chamber 6. Blow-by gas is semi-combusted gas in the combustion process that is leaked in small amounts into the crank chamber 6 through a gap between the piston 8 and the cylinder bore 3a due to an increase in pressure inside the combustion chamber 9 during a combustion stroke of the engine 1 and includes toxic substances such as nitrogen oxides (NOx). Blow-by gas flows in different directions in the fresh air line 26 and the scavenging line 27 during naturally-aspirated operation, in which the supercharger 21 is not substantially supercharged, and during supercharging operation, in which the supercharger 21 is supercharged.

Figure 2A:
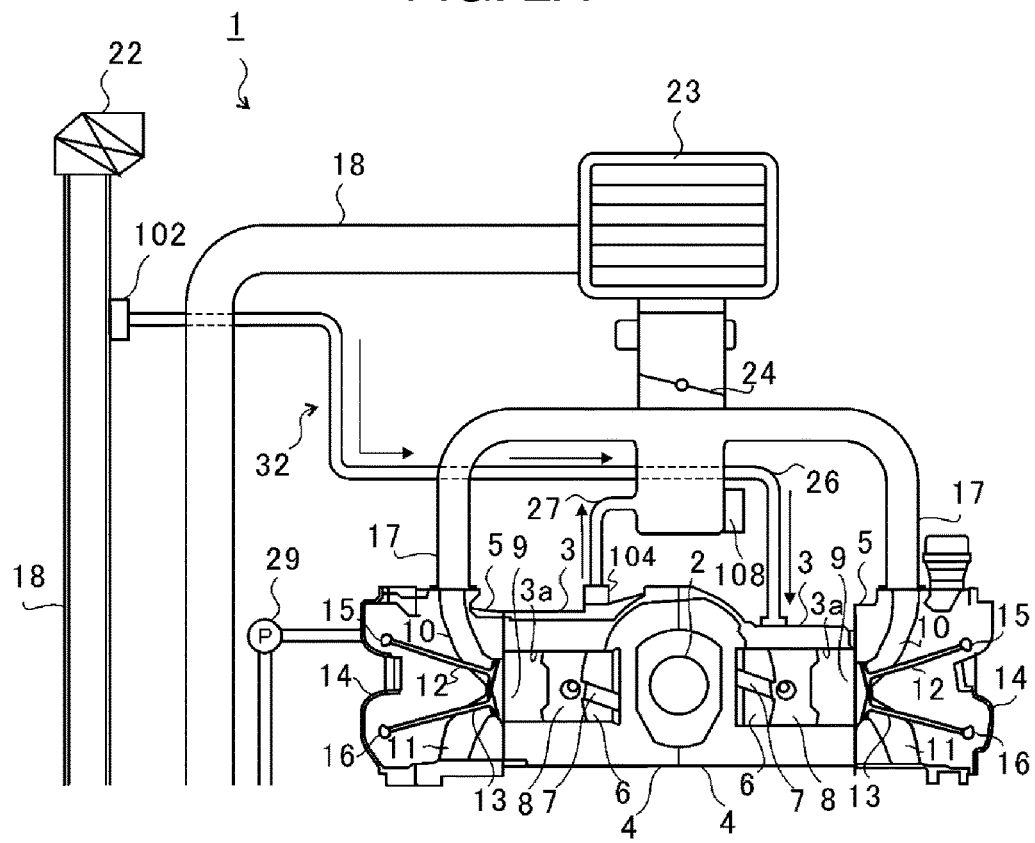
FIG. 2A is an explanatory diagram illustrating a flow of blow-by gas and fresh air during naturally-aspirated operation.
Figure 2B:
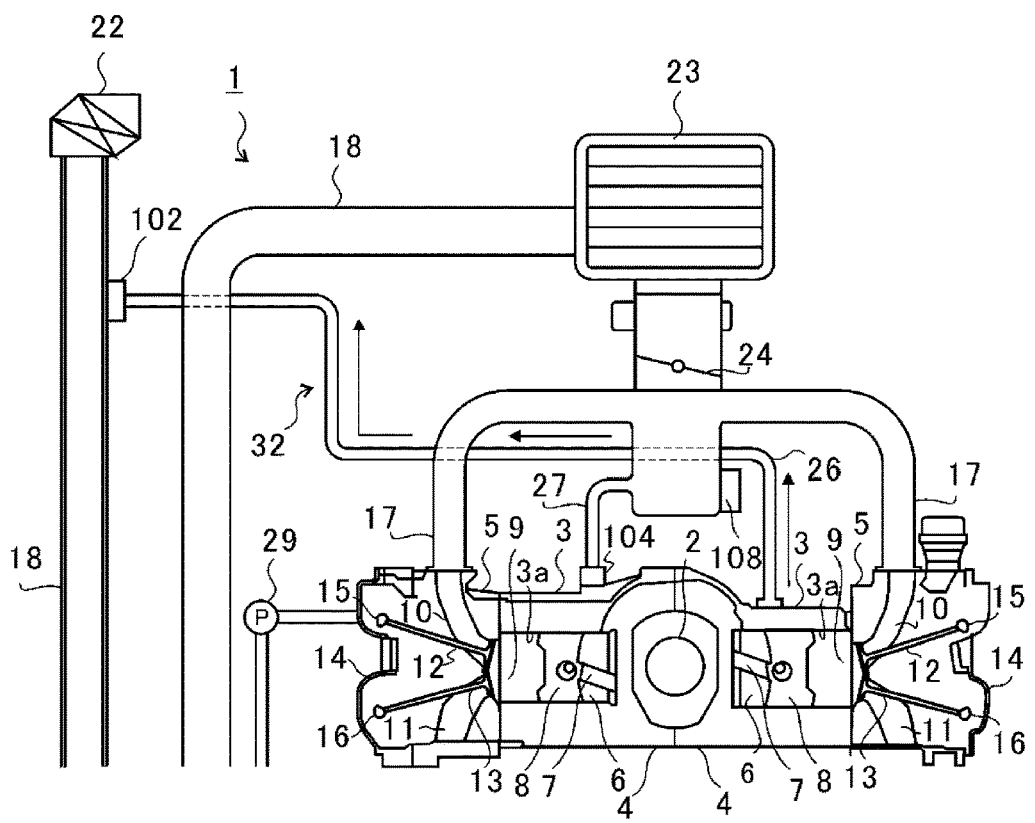
FIG. 2B is an explanatory diagram illustrating a flow of blow-by gas during supercharging operation.

FIG. 2A is an explanatory diagram illustrating the flow of blow-by gas and fresh air during naturally-aspirated operation with solid arrows, and FIG. 2B illustrates the flow of blow-by gas during supercharging operation with solid arrows. As illustrated in FIG. 2A, when the engine 1 performs a naturally-aspirated operation, the leakage detection valve 102 and the PCV valve 104 are opened. In the engine 1, due to negative pressure generated in the intake manifold 17, blow-by gas in the crank chamber 6 is conveyed to the intake manifold 17 via the scavenging line 27, and fresh air is conveyed to the crank chamber 6 via the fresh air line 26.

On the other hand, as illustrated in FIG. 2B, the leakage detection valve 102 is opened and the PCV valve 104 is closed during the supercharging operation (during normal operation) of the engine 1. Due to negative pressure generated in the intake passage 18 between the air cleaner 22 and the compressor 21b, blow-by gas in the crank chamber 6 is sucked out through the fresh air line 26 and introduced into the intake passage 18. At this time, no air flow occurs in the scavenging line 27.

Returning to FIG. 1, an oil catch tank 28 is provided below the supercharger 21. The oil catch tank 28 is connected to the supercharger 21 located above it and temporarily stores oil after lubricating the turbocharger 21. The stored oil is sucked by a scavenging pump 29 and returned to an oil pan (not illustrated) of the engine 1 via a suction line 30. The scavenging pump 29 is connected to a camshaft (not illustrated) that drives the intake valve cam 15 and the exhaust valve cam 16 and is driven by the camshaft.

The oil catch tank 28 is connected to the crank chamber 6 of the crankcase 4 by a balance line 31. More specifically, the balance line 31 is connected to a chain cover (not illustrated). The chain cover is attached to the cylinder block 3, the cylinder head 5 and the head cover 14, and the inside (chain chamber) is partially communicated with the crank chamber 6.

By connecting the crank chamber 6 to the oil catch tank 28, the balance line 31 maintains the pressure in the oil catch tank 28 so that the pressure of the oil catch tank 28 equals the pressure in the crank chamber 6 without being excessively negative pressure from the suction of oil from the scavenging pump 29. Further, by driving the scavenging pump 29, the chain chamber, the balance line 31 and the oil catch tank 28 also serve as flow passages for blow-by gas in the crank chamber 6.

Hereinafter, the crank chamber 6 (crankcase 4), the fresh air line 26, the scavenging line 27, the oil catch tank 28, the balance line 31, and the chain chamber (chain cover), all of which serve as flow passages for the blow-by gas, are collectively called a PCV passage 32.

(Leakage detection device 100) The engine 1 is provided with the leakage detection device 100 for detecting leakage generated in the PCV passage 32. Specifically, the leakage detection device 100 detects leakage occurring in the PCV passage 32. The leakage detection device 100 is configured to include the leakage detection valve 102, the PCV valve 104, a pressure sensor 106 (first pressure measurement unit), a pressure sensor 108 (second pressure measurement unit), a crank angle sensor 120, a control device 110, and a warning unit 130.

The pressure sensor 106 is attached to the crankcase 4 and measures the pressure in the crank chamber 6 formed in the crankcase 4 (that is, the pressure in the PCV passage 32, indirectly). The pressure sensor 108 is attached to the intake manifold 17 and measures the pressure inside the intake manifold 17. The pressure sensors 106, 108 are connected to the control device 110, and output detection signals corresponding to pressures in the crank chamber 6 and the intake manifold 17 are received by the control device 110. The crank angle sensor 120 is provided in the vicinity of the crankshaft 2 and outputs a pulse signal each time the crankshaft 2 rotates by a predetermined angle.

The control device 110 is, for instance, an ECU (Engine Control Unit) which is configured by semiconductor integrated circuits including a central processing unit (CPU), ROM storing such a program, and RAM serving as a work area; and the ECU controls the entire engine 1. In addition to controlling the operation of the entire engine 1, the control device 110 may function as a leakage detection valve controller 112 (first valve controller), a PCV valve controller 114 (second valve controller), a leakage determination unit 116, and a memory unit 118. The memory unit 118 is a nonvolatile memory unit, an HDD (Hard Disk Drive), or a recording medium for a memory card, and so on.

The warning unit 130 warns the driver of leakage when leakage occurs in any of the lines constituting the PCV passage 32. The warning unit 130 is provided as a warning lamp, for instance, on the main panel of the driver's seat. In this case, the warning unit 130 would warn the driver of the occurrence of leakage when leakage has occurred, for instance, by flashing a warning lamp. Hereinafter, the specific operation of the leakage detection device 100 is described.

The control device 110 executes a leakage detection procedure when a predetermined leakage diagnostic condition is satisfied. The leakage diagnostic conditions are, for instance, that the system is undergoing a naturally-aspirated operation, that the vehicle is running, that the engine 1 is low load, and that no sudden load change has occurred in the engine 1. The control device 110 executes such a leakage detection procedure once per driving cycle. If there is a possibility that the suction force of the scavenging pump 29 may affect the pressure in the PCV passage 32, the influence of the suction force of the scavenging pump 29 may be avoided by setting a diagnostic condition that the engine speed is equal to or less than a predetermined value. The engine speed may be the rotation speed of the camshaft driving the scavenging pump 29. Alternatively, when conducting a leakage diagnosis in an operating range where the suction force of the scavenging pump 29 affects the pressure in the PCV passage 32, a pressure detection value and a threshold value can be set (corrected) so as to compensate for the influence of the suction force of the scavenging pump 29. Furthermore, the engine speed is calculated by the control device 110 based on the pulse signal, such as rotational speed of the crankshaft 2, detected by the crank angle sensor 120.

When the leakage diagnostic condition is satisfied, the PCV valve controller 114 gradually reduces the opening degree of the PCV valve 104 until a predetermined opening degree is reached. Specifically, the PCV valve controller 114 gradually reduces the opening degree of the PCV valve 104 over a predetermined period of time. Furthermore, the PCV valve controller 114 may change the time until the PCV valve 104 reaches the predetermined opening degree according to the opening degree of the PCV valve 104 before the leakage diagnostic condition is satisfied.

When the opening degree of the PCV valve 104 reaches a predetermined opening degree, the leakage detection valve controller 112 closes the leakage detection valve 102. As a result, the flow of fresh air introduced from the intake passage 18 into the crank chamber 6 via the fresh air line 26 is blocked. After that, negative pressure is generated in the crank chamber 6 under the influence of negative pressure generated in the intake manifold 17. In addition, negative pressure is generated in the PCV passage 32 formed by the fresh air line 26, the scavenging line 27, and the balance line 31, all of which are connected to the crank chamber 6.

In addition, the PCV valve controller 114 adjusts the opening degree of the PCV valve 104 according to the pressure in the intake manifold 17 after closing the leakage detection valve 102 so that the flow rate of the blow-by gas flowing to the scavenging line 27 becomes a predetermined (constant) amount.

Specifically, the PCV valve controller 114 receives the pressure value inside the intake manifold 17 after closing the leakage detection valve 102 from the pressure sensor 108. Then, in order to prevent too much negative pressure from being generated inside the crank chamber 6, the PCV valve controller 114 decreases the opening degree of the PCV valve 104 as the negative pressure in the intake manifold 17, being received from the pressure sensor 108, increases, and the PCV valve controller 114 reduces the flow rate of blow-by gas flowing from inside the crank chamber 6 to the scavenging line 27. By doing so, the leakage detection device 100 maintains the flow rate of blow-by gas flowing to the scavenging line 27 at a predetermined (constant) value.

The pressure sensor 106 starts measuring the pressure in the crank chamber 6 after the leakage detection valve 102 is closed and outputs a detection signal indicating the measured pressure to the leakage determination unit 116.

FIG. 3A is a diagram illustrating the pressure in the crank chamber 6 in a normal state. FIG. 3B is a diagram illustrating the pressure in the crank chamber 6 in an abnormal state (when leakage occurs).

As illustrated in FIG. 3A, when the leakage detection valve 102 is closed in a normal state where leakage does not occur in the PCV passage 32, the pressure in the crank chamber 6 decreases. At this time, the PCV valve controller 114 adjusts the opening degree of the PCV valve 104 according to the pressure in the intake manifold 17 to keep the flow rate of the blow-by gas constant, and as a result, the pressure in the crank chamber 6 is prevented from changing abruptly. That is, the pressure in the crank chamber 6 gradually decreases linearly by keeping the flow rate of the blow-by gas constant. In this way, erroneous detection of leakage due to a sudden change in pressure inside the crank chamber 6 is prevented.

Also, the pressure in the crank chamber 6 decreases below a threshold value P2 set ahead of time when a predetermined measurement time has elapsed after the leakage detection valve 102 is closed in a normal state. Here, when leakage has not occurred in the PCV passage 32 of the engine 1, the threshold value P2 is at least set to a value smaller than atmospheric pressure and larger than the pressure value (negative pressure value) measured in the crank chamber 6 when the measurement time has elapsed after the leakage detection valve 102 has been closed. Furthermore, although the value of the threshold value P2 can be set to any value, if a stricter leakage determination is desired, the threshold value P2 should be set to a smaller value. The set threshold value P2 is stored in the memory unit 118 of the control device 110.

On the other hand, in an abnormal state in which leakage has occurred in the PCV passage 32, due to air being sucked from the leaking point of the PCV passage 32, as illustrated in FIG. 3B, the pressure in the crank chamber 6 may not decrease, or even though the pressure in the crank chamber 6 decrease, the threshold value P2 will not be reached eventually until the measurement time elapses.

Therefore, when a predetermined measurement time has elapsed after the start of the measurement, the leakage determination unit 116 extracts a pressure P1 in the crank chamber 6. The leakage determination unit 116 then determines whether the pressure P1 in the crank chamber 6 is less than or equal to the threshold value P2 at the time when a preset measurement time has elapsed after the start of measurement.

As a result, when the pressure P1 is equal to or less than the threshold value P2, the leakage determination unit 116 determines that no leakage occurs in any line constituting the PCV passage 32. On the other hand, when the pressure P1 is not equal to or less than the threshold value P2, that is, if the pressure P1 has not become equal to or less than the threshold value P2 even when the measurement time elapses after the leakage detection valve 102 has been closed, the leakage determination unit 116 determines that leakage has occurs in one of the lines constituting the PCV passage 32.

Then, if it is determined that leakage has occurred in any line constituting the PCV passage 32, the leakage determination unit 116 stores a predetermined malfunction code (P code "P 04 DB") in the memory unit 118 of the control device 110. Also, the leakage determination unit 116 warns the driver of the vehicle that the leakage has occurred with the warning unit 130.

In this way, in the leakage detection device 100, negative pressure is generated in the crank chamber 6 by closing the leakage detection valve 102 for blocking the flow of fresh air introduced into the crank chamber 6. It is then possible to detect the presence or absence of leakage in the PCV passage 32 by comparing the pressure P1 in the crank chamber 6 with the threshold value P2 when the leakage detection valve 102 is completely closed and the measuring time has elapsed.

Here, in the present example, the leakage detection valve 102 is provided at the end of the fresh air line 26 that connects with the intake passage 18. Therefore, when a leakage occurs in the fresh air line 26, air flows in, from the leakage point regardless of the location where the leakage occurs, and the pressure in the crank chamber 6 does not become equal to or less than the threshold value P2 even when the measurement time elapses after the leakage detection valve 102 has been closed. Accordingly, when leakage occurs in the fresh air line 26, the leakage determination unit 116 reliably determines that leakage has occurred regardless of the location of the leakage.

Figure 4:
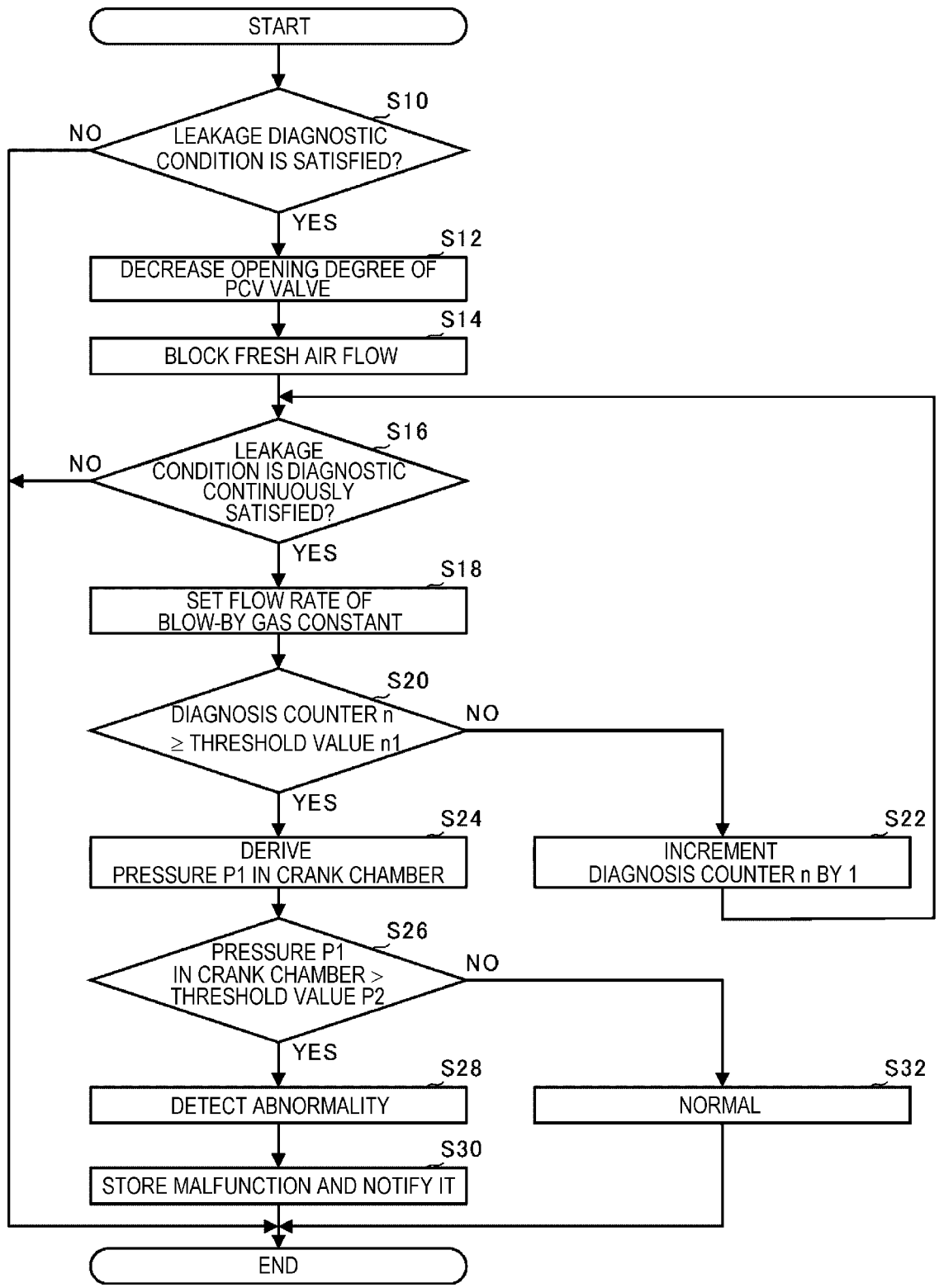
FIG. 4 is a flowchart illustrating a leakage detection procedure.

(Leakage Detection Procedure) Next, the flow of the leakage detection procedure of the PCV passage 32 by the leakage detection device 100 is described. FIG. 4 is a flowchart for explaining the leakage detection procedure.

First, the PCV valve controller 114 determines whether the leakage diagnostic condition is satisfied (S10). If the leakage diagnostic condition is satisfied (YES in step S10), the PCV valve controller 114 gradually reduces the opening degree of the PCV valve 104 until a predetermined opening degree (S12) is reached. Thereafter, the leakage detection valve controller 112 closes the leakage detection valve 102 and blocks the flow of fresh air introduced into the crank chamber 6 (S14).

Next, the PCV valve controller 114 determines whether the leakage diagnostic condition is continuously satisfied (S16). As a result, if the leakage diagnostic condition is continuously satisfied (YES in step S16), the PCV valve controller 114 adjusts the opening degree of the PCV valve 104 according to the pressure in the intake manifold 17 and sets the flow rate of the blow-by gas to a predetermined (constant) amount (S18).

The leakage determination unit 116 determines whether a diagnosis counter n is equal to or larger than a threshold value n1 (S20). As a result, when it is determined that the diagnosis counter n is not equal to or larger than the threshold value n1 (NO in step S20), the leakage determination unit 116 increment the diagnosis counter n by 1 (S22) and returns the procedure to S16. Furthermore, the diagnosis counter n is used to measure the measurement time, and the threshold value n1 is set to a value corresponding to the measurement time.

On the other hand, if it is determined that the diagnosis counter n is equal to or larger than the threshold value n1 (YES in step S20), the leakage determination unit 116 derives the pressure P1 in the crank chamber 6 from the detection signal inputted from the pressure sensor 106 (S24).

Next, the leakage determination unit 116 determines whether the pressure P1 in the crank chamber 6 is greater than the threshold value P2 (S26). As a result, if the pressure P1 in the crank chamber 6 is larger than the threshold value P2 (YES in step S26), the leakage determination unit 116 determines that a leakage is occurring in any one of the lines constituting the PCV passage 32 (S28). That is, the leakage determination unit 116 detects any abnormality in the PCV passage 32. The leakage determination unit 116 then stores a malfunction code for a designation indicating the occurrence of leakage in the memory unit 118 of the control device 110, and the warning unit 130 notifies the driver that an abnormality has been detected (that an abnormality has occurred) (S30) and ends the leakage detection procedure.

On the other hand, if the pressure P1 in the crank chamber 6 is equal to or lower than the threshold value P2 (NO in step S26), the leakage determination unit 116 determines that no leakage occurs in any of the lines constituting the PCV passage (S32). That is, the leakage determination unit 116 determines that the PCV passage 32 is normal and ends the leakage detection procedure.

Furthermore, when the predetermined leakage diagnostic condition is not satisfied (NO in step S10) and when the diagnostic condition is not continuously satisfied (NO in step S16), the leakage determination unit 116 ends (cancels) the leakage detection procedure.

With this configuration, sudden changes in the air in the crank chamber 6 are avoided by gradually closing the PCV valve 104, which enables the leakage detection device 100 to detect leakage without the combustion in engine 1 being unstable during the leakage detection procedure. In addition, during leakage detection, the accuracy of leakage detection is improved by controlling the opening degree of the PCV valve 104 so that the flow rate of the blow-by gas is constant. Accordingly, in a state in which influence on drivability is minimal, the leakage detection device 100 can detect leakage in the PCV passage 32.

Although a preferred example of the present invention with reference to the accompanying drawings has been described, the present invention is not limited to such examples. Provided a person has ordinary knowledge in the technical field to which the example of the present invention pertains, within the scope of the technical idea described in the claims, the example of the present invention is intended to cover various modifications and applications, and such modifications are intended to fall within the technical scope of the present invention.

For instance, in the above example, a description has been given of an application of the leakage detection device 100 in a horizontally opposed 4-cylinder engine, but the present invention is not limited to this and can be applied to a V engine or an inline engine.

In the above example, the warning unit 130 has been described for a case in which the warning is done through the main panel of the driver's seat (i.e., a case in which the warning is visual), but the warning can also be done with a non-visual, auditory warning, such as a buzzer sound.

Further, in the above example, a pressure sensor 106 was additionally provided to the crankcase 4, and although an example in which the pressure sensor 106 measures the pressure in the crank chamber 6 was described, the installation location of the pressure sensor 106 is not limited to the location of the example and may be at, for instance, any location along the fresh air line 26 and the balance line 31. That is, the pressure sensor 106 has only to be installed in any position capable of measuring the pressure in the PCV passage 32.

Further, in the above example, although an example was described in which the PCV valve control unit 114 adjusts the opening degree of the PCV valve 104 in accordance with the pressure in the intake manifold 17, the PCV valve control unit 114 may adjust the opening degree of the PCV valve 104 in accordance with the pressure in the crank chamber 6 measured by the pressure sensor 106.

Further, in the above example, although a configuration has been described in which the leakage detection valve 102 is provided at the end of the fresh air line 26 that connects with the intake passage 18, the installation location of the leakage detection valve 102 is not limited to this location and can be midway along the length of the fresh air line 26.

Figure 5:
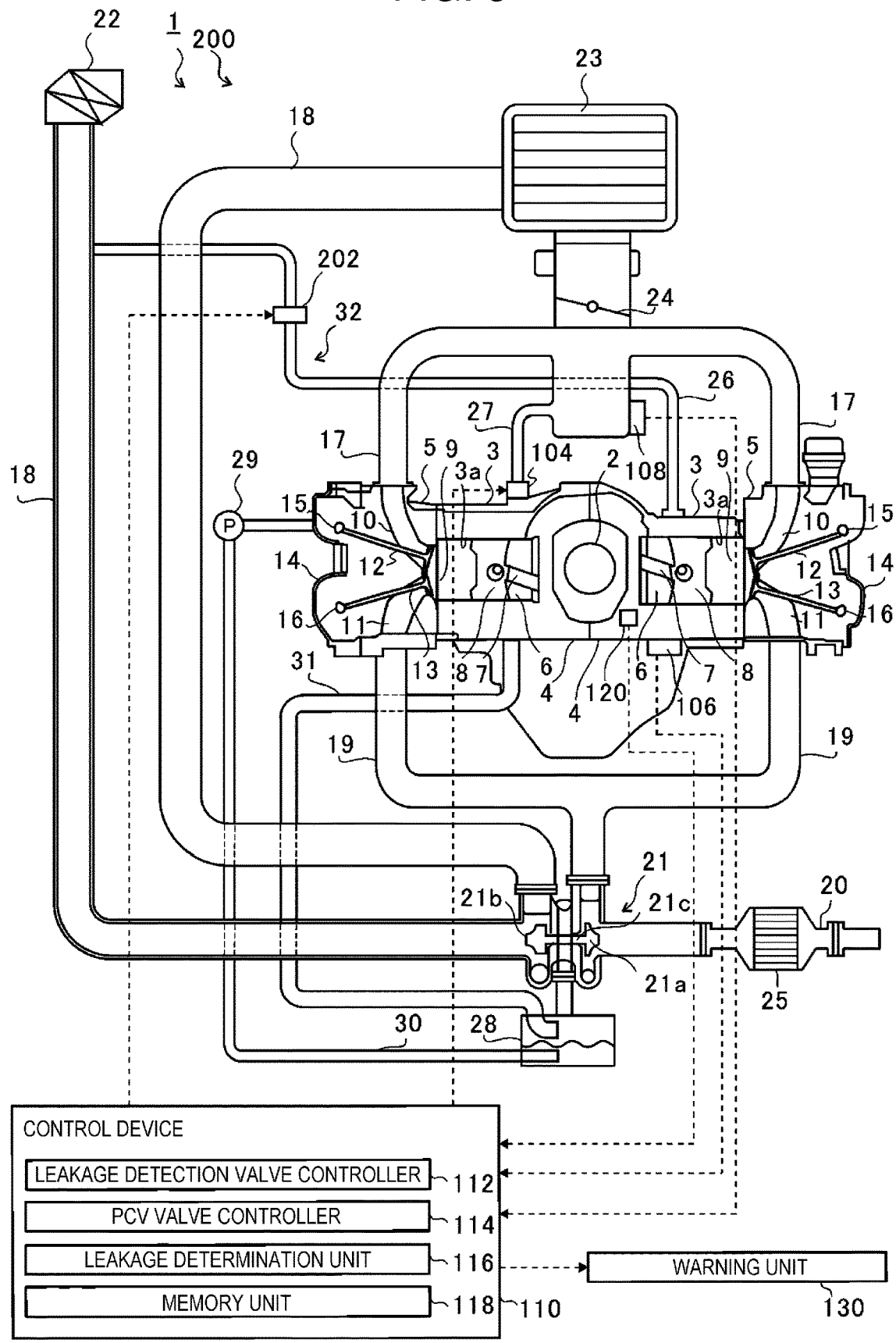
FIG. 5 is a schematic diagram of an engine provided with a leakage detection device in a modified example.

For instance, a leakage detection device 200 according to the modified example illustrated in FIG. 5, a leakage detection valve 202 is provided midway along the length of the fresh air line 26. Then, in the leakage detection device 200, when leakage detection begins, the leakage detection valve controller 112 closes the leakage detection valve 202 provided midway along the length of the fresh airline 26. In this case also, the flow of fresh air to be introduced into the crank chamber 6 via the fresh air line 26 from the intake passage 18 is blocked and, as in the above example, leakage that occurs in the PCV passage 32 is detected.

In the present invention, the supercharger 21 is not necessarily required and, therefore, the present invention can also be applied to an engine without providing with the supercharger 21.

The invention claimed is:

1. A leakage detection device configured to detect leakage in a positive crankcase ventilation passage, the positive crankcase ventilation passage including at least a scavenging line that communicates with a crank chamber of an engine and an intake manifold of an intake passage of the engine at a portion downstream of a throttle valve, and a fresh air line that communicates with the crank chamber and the intake passage at a portion upstream of the throttle valve, the leakage detection device comprising:
   a first pressure measurement unit configured to measure a pressure in the positive crankcase ventilation passage;
   a leakage detection valve configured to open and close the fresh air line;
   a positive crankcase ventilation valve configured to adjust a flow rate of a blow-by gas conveyed to the intake manifold, via the scavenging line, from the crank chamber;
   a second pressure measurement unit configured to measure a pressure of the intake manifold in the intake passage of the engine downstream of the throttle valve;
   a first valve controller configured to perform control to close the leakage detection valve when a predetermined leakage diagnostic condition is satisfied;
   a second valve control unit configured to reduce an opening degree of the positive crankcase ventilation valve before the leakage detection valve is closed, and to suppress a flow rate in the positive crankcase ventilation passage to a predetermined amount in accordance with the pressure in the intake manifold after the leakage detection valve is closed to decrease a pressure in the crank chamber in a substantially linear manner by keeping the flow rate in the positive crankcase ventilation passage substantially constant at the predetermined amount; and
   a leakage determination unit configured to determine whether leakage occurs in the positive crankcase ventilation passage on a basis of the pressure in the positive crankcase ventilation passage.

2. The leakage detection device according to claim 1, wherein, in a case where a negative pressure is generated in the intake passage downstream of the throttle valve, the leakage determination unit determines that leakage occurs in the positive crankcase ventilation passage when the pressure in the positive crankcase ventilation passage is not equal to or below a predetermined value after a predetermined measurement time elapses after the leakage detection valve is closed.

3. The leakage detection device according to claim 1, further comprising a compressor configured to supercharge air flowing into the intake passage, the compressor being provided downstream of an area of the intake passage, and upstream of the throttle valve, the area being communicated with the fresh air line,
   wherein the fresh air line is coupled to the intake passage at a portion upstream of the compressor.

4. The leakage detection device according to claim 2, further comprising a compressor configured to supercharge air flowing into the intake passage, the compressor being provided downstream of an area of the intake passage, and upstream of the throttle valve, the area being communicated with the fresh air line, wherein the fresh air line is coupled to the intake passage at a portion upstream of the compressor.

5. The leakage detection device according to claim 1, wherein, in a case where a negative pressure is generated in the intake passage downstream of the throttle valve, the leakage determination unit determines that leakage occurs in the positive crankcase ventilation passage when the pressure in the positive crankcase ventilation passage is not equal to or below a predetermined value.

6. The leakage detection device according to claim 1, wherein the positive crankcase ventilation valve is provided at a connection between the scavenging line and the crank chamber.

7. The leakage detection device according to claim 1, wherein the second pressure measurement unit sends to the second valve control unit a pressure value of an inside of the intake manifold after that the leakage detection valve is closed.

8. The leakage detection device according to claim 1, further comprising a balance line that communicates between the crank chamber of the engine and an oil catch tank to retain a pressure in the oil catch tank to be equal to the pressure in the crank chamber, and prevents an excess negative pressure in the oil catch tank caused by a suction of oil by a scavenging pump.

9. The leakage detection device of claim 1, wherein a closing of the leakage detection valve causes the pressure in flow passages for the blow-by gas to become negative, and an absence of leakage in the flow passages for the blow-by gas is detected when the negative pressure increases over a predetermined lapse of time to a predetermined value.

10. The leakage detection device according to claim 9, wherein a presence of the leakage is detected when the negative pressure does not increase over the predetermined lapse of time to the predetermined value.

11. The leakage detection device according to claim 1, wherein the leakage detection valve is provided at an end of the fresh air line where the fresh air line connects to the intake passage.

12. A leakage detection device configured to detect leakage in a positive crankcase ventilation passage, the leakage detection device comprising:
    a first pressure measurement unit configured to measure a pressure in the positive crankcase ventilation passage, the positive crankcase ventilation passage including:
        a scavenging line that communicates with a crank chamber of an engine and an intake manifold of an intake passage of the engine at a portion downstream of a throttle valve; and
        a fresh air line that communicates with the crank chamber and the intake passage at a portion upstream of the throttle valve;
    a leakage detection valve configured to open and close the fresh air line;
    a positive crankcase ventilation valve configured to adjust a flow rate of a blow-by gas conveyed to the intake manifold, via the scavenging line, from the crank chamber;
    a second pressure measurement unit configured to measure a pressure of the intake manifold in the intake passage of the engine downstream of the throttle valve; and
    a controller configured to:
        perform control to close the leakage detection valve;
        reduce an opening degree of the positive crankcase ventilation valve before the leakage detection valve is closed;
        suppress a flow rate in the positive crankcase ventilation passage to a predetermined amount in accordance with the pressure in the intake manifold after the leakage detection valve is closed to decrease a pressure in the crank chamber in a substantially linear manner by keeping the flow rate in the positive crankcase ventilation passage substantially constant at the predetermined amount; and
        determine whether leakage occurs in the positive crankcase ventilation passage on a basis of the pressure in the positive crankcase ventilation passage.

13. The leakage detection device according to claim 12, wherein, in a case where a negative pressure is generated in the intake passage downstream of the throttle valve, the controller determines that leakage occurs in the positive crankcase ventilation passage when the pressure in the positive crankcase ventilation passage is not equal to or below a predetermined value.

14. The leakage detection device according to claim 12, wherein the leakage detection valve is provided at an end of the fresh air line where the fresh air line connects to the intake passage.

15. The leakage detection device according to claim 12, wherein the positive crankcase ventilation valve is provided at a connection between the scavenging line and the crank chamber.

16. The leakage detection device according to claim 12, wherein the second pressure measurement unit sends to the controller a pressure value of an inside of the intake manifold after that the leakage detection valve is closed.

17. The leakage detection device according to claim 12, further comprising a balance line that communicates between the crank chamber of the engine and an oil catch tank to retain a pressure in the oil catch tank to be equal to the pressure in the crank chamber, and prevents an excess negative pressure in the oil catch tank caused by a suction of oil by a scavenging pump.

18. The leakage detection device of claim 12, wherein closing of the leakage detection valve causes the pressure in flow passages for the blow-by gas to become negative, and an absence of leakage in the flow passages for the blow-by gas is detected when the negative pressure increases over a predetermined lapse of time to a predetermined value.

19. The leakage detection device according to claim 18, wherein a presence of the leakage is detected when the negative pressure does not increase over the predetermined lapse of time to the predetermined value.

20. The leakage detection device according to claim 12, further comprising a compressor configured to supercharge air flowing into the intake passage, the compressor being provided downstream of an area of the intake passage, and upstream of the throttle valve, the area being communicated with the fresh air line,
    wherein the fresh air line is coupled to the intake passage at a portion upstream of the compressor.

* * * * *